United States Patent

Fuller et al.

[15] 3,646,580

[45] Feb. 29, 1972

[54] SURFACE VEHICLE FLEET COMMAND AND CONTROL SYSTEM

[72] Inventors: Roger L. Fuller, Stow; Robert K. Kaye, Framingham; Joseph J. Oliver, Allston; William H. Rood, Acton, all of Mass.

[73] Assignee: Raytheon Company, Lexington, Mass.

[22] Filed: July 18, 1969

[21] Appl. No.: 842,885

[52] U.S. Cl. ....................................325/53, 325/29, 325/58, 340/24, 343/6.5, 343/112

[51] Int. Cl. ..........................................................G01s 9/56

[58] Field of Search ..............343/6, 6.5, 6.5 LC, 6.8, 6.8 LC, 343/112, 112 TC, 13, 14; 325/1, 3, 5, 6, 51, 53, 54, 57, 58; 340/22, 23, 24, 52, 53, 62

[56] References Cited

UNITED STATES PATENTS

| | | | |
|---|---|---|---|
| 2,642,524 | 6/1953 | Bayliss | 325/59 X |
| 3,063,048 | 11/1962 | Lehan et al. | 325/6 X |
| 3,068,473 | 12/1962 | Muth | 343/112 |
| 3,369,239 | 2/1968 | Perkinson et al. | 343/112 |
| 3,434,140 | 3/1969 | Chisholm | 343/6 |
| 3,495,260 | 2/1970 | Laughlin et al. | 343/6.5 X |
| 3,474,460 | 10/1969 | Huebscher | 343/6.5 |

*Primary Examiner*—Benedict V. Safourek
*Attorney*—Harold A. Murphy and Joseph D. Pannone

[57] ABSTRACT

A system for communicating with and locating mobile surface vehicles in a high multipath signal clutter environment such as an urban center. This system seeks to take advantage of the scattering of the CW wave in urban areas for both communication and ranging where line of sight radiation techniques may not properly function. A plurality of remote relay stations are located at fixed points throughout the urban area. Each station receives and transmits wireless coded digital data and tone burst signals, the tone burst signals being used for phase ranging. Additionally, each of the surface vehicles is equipped with a transponder. The vehicle transponder is responsive only to a radio signal having a formatted message. This includes the vehicle identification code and a ranging tone suitably impressed thereon. The formatted signal is transmitted from one of the relay stations and picked up by a preselected number of other relay stations as well as the vehicle transponder. The transponder in turn generates a reply signal containing message data and a tone burst signal in phase with the original transmitted signal.

7 Claims, 11 Drawing Figures

*MESSAGE STRUCTURE, SEQUENCE, AND TIMING*

VEHICLE LOCATION COMMUNICATION AND CONTROL SYSTEM

INVENTORS
ROGER L. FULLER
ROBERT K. KAYE
JOSEPH J. OLIVER
WILLIAM H. ROOD
BY Robert Bruce Brodie
ATTORNEY INVENTORS
ROGER L. FULLER
ROBERT K. KAYE
JOSEPH J. OLIVER
WILLIAM H. ROOD
BY Robert Bruce Brodie
ATTORNEY

INVENTORS
ROGER L. FULLER
ROBERT K. KAYE
JOSEPH J. OLIVER
WILLIAM H. ROOD

BY Robert Bruce Brodie
ATTORNEY

*MESSAGE TIMING SEQUENCE*

*MESSAGE STRUCTURE, SEQUENCE, AND TIMING*

INVENTORS
ROGER L. FULLER
ROBERT K. KAYE
JOSEPH J. OLIVER
WILLIAM H. ROOD

BY Robert Bruce Brodie
ATTORNEY

TYPICAL VEHICLE LOCATION OPERATION

INVENTORS
ROGER L. FULLER
ROBERT K. KAYE
JOSEPH J. OLIVER
WILLIAM H. ROOD

BY Robert Bruce Brodie
ATTORNEY

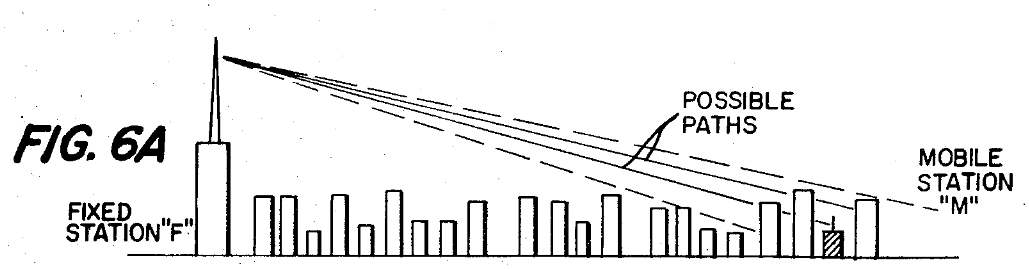

FIG. 6A

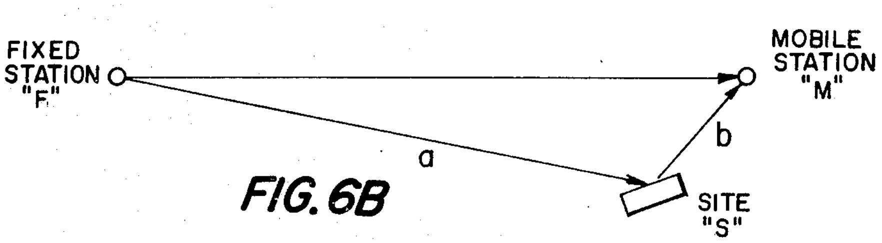

FIG. 6B

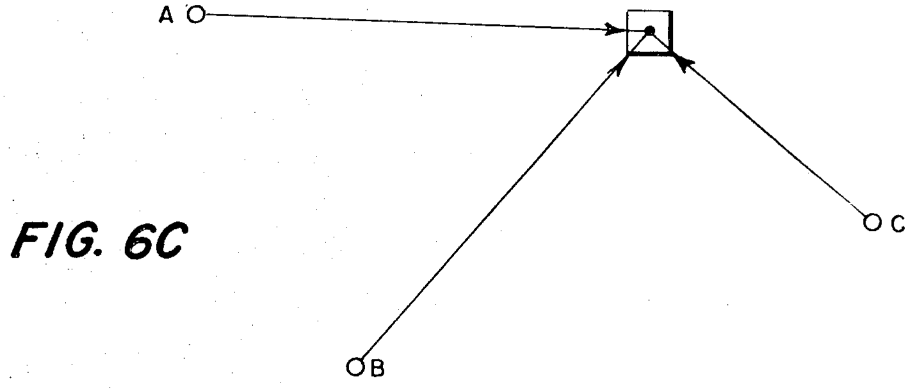

FIG. 6C

| TRANSMIT FROM-TO VEHICLE | RECEIVE AT-FROM VEHICLE | COMPUTE |
|---|---|---|
| A | A B C | $P_A$ (BUS POSITION) |
| B | A B C | $P_B$ (BUS POSITION) |
| C | A B C | $P_C$ (BUS POSITION) |

IN LOW LEVEL MULTIPATH AREAS $P_A = P_B = P_C$

IN PROBLEM MULTIPATH AREAS $P_A \neq P_B \neq P_C$

EXAMINATION OF $P_A, P_B, P_C$ DETERMINES WHETHER TO CAST ONE OUT (GREATLY DIFFERENT) OR AVERAGE

FIG. 6D

INVENTORS
ROGER L. FULLER
ROBERT K. KAYE
JOSEPH J. OLIVER
WILLIAM H. ROOD
BY Robert Bruce Brodie
ATTORNEY

SURFACE VEHICLE FLEET COMMAND AND CONTROL SYSTEM

BACKGROUND OF THE INVENTION

This invention relates to the command and control of a large number of mobile surface vehicles such as police and emergency vehicles and rapid transit buses, and more particularly to the communication and location of such vehicles in high clutter signal environments which are characteristic of urban centers having tall buildings.

In conventional two-way voice communication systems, a mobile radiotelephone in each vehicle communicates with a central base station. A few remote relay stations are used when necessary in weak signal areas. In such systems, a typical radio signal channel has a capacity for handling 200 to 250 vehicles. This means that as the system expands, additional channels are required. These channels may not be available because of the strict frequency allocation policies of the Government. Also, additional receiver monitors may be required at the base station for each channel. Further, only manual rather than automatic position location and schedule adherence is possible. Additionally, the presence of such a large number of signal sources coming within a central point increases the probability of signal blockage. Lastly, the driver's handling of the vehicle must be disturbed to operate the radio.

To accommodate both the location and communication functions in the control system, a class of systems called "distributed roadside systems" has been employed. These systems require the installation of equipment either buried in the road or adjacent to the road on a post. The function of this equipment establishes the position of a nearby vehicle since the position of the roadside equipment is known. Reference may be made to U.S. Pat. No. 2,597,517 to D. E. Noble issued on May 20, 1952 and U.S. Pat. No. 2,790,071 issued to D. L. Gunn on Apr. 23, 1957.

Distributed roadside systems may be divided into two groups. The first group requires the vehicle to transmit its identity to the roadside equipment by radio. The roadside equipment receives this signal and retransmits the vehicle identity by, for example, direct telephone line to a control center. The second group operates in a converse manner. In this situation the roadside equipment transmits its equipment identity code to the vehicle by radio. The vehicle retransmits both the code of the roadside equipment and its vehicle identity by radio directly to a common control station.

In both groups the accuracy of location of the vehicles is directly related to the number and location of the roadside equipments. The more accurate the location, the more roadside equipments are needed. As an additional disadvantage, flexibility is limited because the vehicle must pass close to the roadside equipment in order to be detected.

The prior art also discloses a number of vehicle location systems based upon triangulation from a number of known points. Attention is directed to U.S. Pat. No. 2,470,787 issued in the name of P. S. Nosker, on May 24, 1949, relating to a system for determining the position or path of objects in space. This system uses a plurality of ranging stations for phase ranging upon an airborne vehicle equipped with a transponder. No mention is made of treating the effects of multipath caused by the CW wave bounding back from the ionosphere. Also of interest is U.S. Pat. No. 2,717,735 to D. G. C. Luck issued on Sept. 13, 1955.

In the contemporary art, phase ranging of a vehicle in space has taken the form of high frequency highly directed antennas and propagation patterns. The problems of multipath are in part avoided by using directive antennas and by pointing them skywards. In this regard, reference is made to the "Institute of Radio Engineers Transactions on Antennas and Propagation," Oct. 1955, at pages 185 through 192 in an article entitled "-Multipath Phase Errors in CW-FM Tracking Systems" by T. E. Sollenberger.

Where prior art systems have used microwave frequency line of sight pulsing, then a wide band width in the order of several megacycles is required. This arises because the pulses require very sharp leading edges in order to obtain the requisite range accuracy. If an azimuth triangulation system embodying the omnirange concept is employed, then at least three transmitters generating respective narrow beams sufficient to obtain position accuracy are necessary. Both cases are inimical to bandwidth conservation.

SUMMARY OF THE INVENTION

It is an object of this invention to devise a system for command and control of a fleet of mobile surface vehicles in a high clutter multipath signal environment, especially in urban areas.

It is a related object that both the location and communication functions between and among vehicles and a remote station utilize the same equipments.

It is yet another object of this invention that such a system make efficient utilization of the limited bandwidth available to mobile vehicle voice radio communication channels. Relatedly, it is desired that the system permit vehicle location to be within a high order of accuracy. It is yet still another object of this invention to utilize digital coding and the ascertainment of vehicle location and communication on a repetitive or cyclical basis in a vehicle fleet expandable to several thousand units.

The aforementioned objects are satisfied in an embodiment comprising a common control arrangement; *m* remote relay stations, each station being capable of wireless signal transmission and reception and including means for communicating with the control arrangement; and a plurality of transponders located in corresponding surface vehicles, each transponder being operable upon receipt of a suitable signal transmitted from at least one remote relay station.

The invention contemplates means at one of the remote relay stations under control of the common control arrangement for transmitting an omnidirectional signal with coded indicia impressed thereon; means at selected transponders responsive only to the coded indicia for generating an omnidirectional coded reply signal within a predetermined time after initial receipt of the transmitted signal; and receiving means at *n* of *m* remote relay stations for detecting and decoding the original transmitted signal and the reply signal and further including means for communicating said decoded reply signal to the common control arrangement.

The common control arrangement formats and transmits messages to a preselected one of the relay stations. Each message has a synchronization portion, a vehicle identification portion, a coded data portion and a tone burst superimposed thereon for ranging purposes. These formatted messages are broadcast by this preselected one remote relay station as a substantially nondirectional signal. Only those transponders which contain the corresponding vehicle identification code will be responsive to this broadcasted formatted message. Such transponders synchronize their decoding and encoding function upon the synchronization portion of the signal.

A substantially nondirectional coded reply signal is retransmitted within a predetermined time after receipt of the transmitted signal. Each reply signal includes synchronization, a coded data and a tone burst portion thereof. The tone burst of the reply signal is in phase with the original tone burst received from the relay station.

Each of *n* out of *m* relay stations receives the original broadcast as well as the transponder. Consequently, when the reply signals are received at the station the tone bursts may be compared in phase and transmitted back to the common control arrangement. This phase difference is, of course, related to the distance between the remote relay station and the vehicle transponder.

By simultaneously being able to make independent ranging measurements, a center of gravity of the area of probable error can be made to approach the actual vehicle location in the limit, if the number of independent ranging measurements is increased. Advantageously, the number of remote relay stations which can be actuated can range from one to m.

Because the speed of light is a constant and there exists only a very small time interval between multiple reflections, it can be shown that the ranging error taken on one phase measurement between a vehicle and the remote station is in the order of ±1,000 feet for 95 percent of the range samples. This system thus uses the scattering of a CW wave as a positive attribute. This is especially significant where a vehicle is located in the shadow areas of man made or natural objects. Contrary to the art, it has further been found that no unusual precautions must be taken to compensate for multipath in terms of signal to noise or fading phenomenon.

The *m* relay stations are dispersed in proportion to the power at which they operate. Each relay station includes means for transceiving voice, digital data, and ranging tone information. Each signal transmitted from the relay station is encoded in a predetermined digital format. The formatted message includes instructions to the vehicle which determine the transponder action. The transponder in turn formats a new digital code for reply. This communication facility, when combined with the phase comparison ranging tones, utilizes substantially the same equipments to perform both the communication and location functions. Significantly, no roadside equipment is necessary and only a small number of fixed relay stations are required for a large area. These stations are fixed and are independent of the number of vehicles or routes. Flexibility is excellent, requiring virtually no equipment changes. By using a stored program element and formatted digital messages, mutual interference is avoided because these functions may be performed sequentially and not in parallel.

BRIEF DESCRIPTION OF THE DRAWINGS

FIGS. 6A and 6B represent respectively the side and plan views of the relevant station positions in a typical urban center.

FIGS. 6C and 6D relate to the error reduction in multipath by multiple range measurements.

DESCRIPTION OF THE PREFERRED EMBODIMENT

Figure 1:
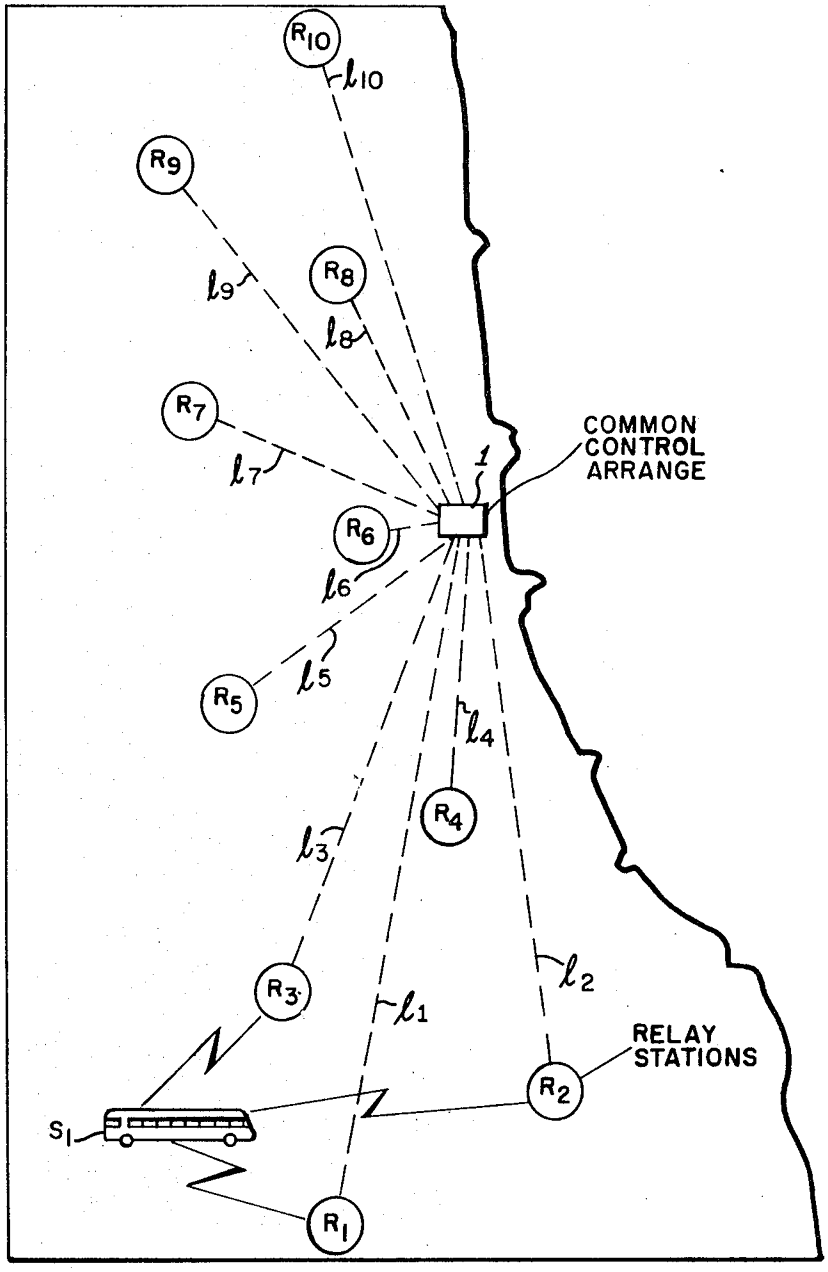
FIG. 1 shows the geographical distribution of the common control arrangement, relay stations and a surface vehicle overlaying a large urban center such as Chicago.

Referring now to FIG. 1 of the drawing, there is shown the geographical distribution of system elements overlaying a map of a typical urban center, such as Chicago, Illinois. At one fixed location, a common control arrangement 1 electrically communicates with a plurality of remote relay stations $R_1$, $R_2$–$R_{10}$ over corresponding links $l_1$, $l_2$–$l_{10}$. A selected number of these relay stations $R_1$, $R_2$, and $R_3$, communicate with a mobile surface vehicle $S_1$.

The control arrangement combines computer, display, communications, recording, and control functions. The relay stations include communications equipment for bilaterally sending and receiving messages to the control arrangement and also sending and receiving messages with the mobile surface vehicle. Each of the links $l_1$–$l_{10}$ may comprise a data channel such as a telephone line, with the associated terminal conversion equipment, at both ends thereof.

The control arrangement includes means for activating, in general, any combination of the remote relay stations for purposes of transmitting a message to one or more mobile surface vehicles. With this general capability, it is thus possible, and indeed desirable, to systematically activate different groups of stations for purposes of communication and ranging in some repetitive pattern.

Operationally station $R_2$, for example, broadcasts a formatted message with a ranging tone. Stations $R_1$ and $R_3$ receive the broadcast in addition to the transponder unit at vehicle $S_1$. $S_1$ generates a reply signal including a ranging tone in phase with the received tone. Stations $R_1$, $R_2$, and $R_3$ receive the reply signal and make independent phase ranging measurements based upon the original and reply ranging tone phase difference.

Each relay station returns its ranging information to a computing element in the control arrangement. This element calculates the center of gravity of an area of intersection of the three ranges and checks this location against the scheduled position of the vehicle. Any schedule mismatch may be ascertained as to whether additional communication action should be taken.

Figure 2A:
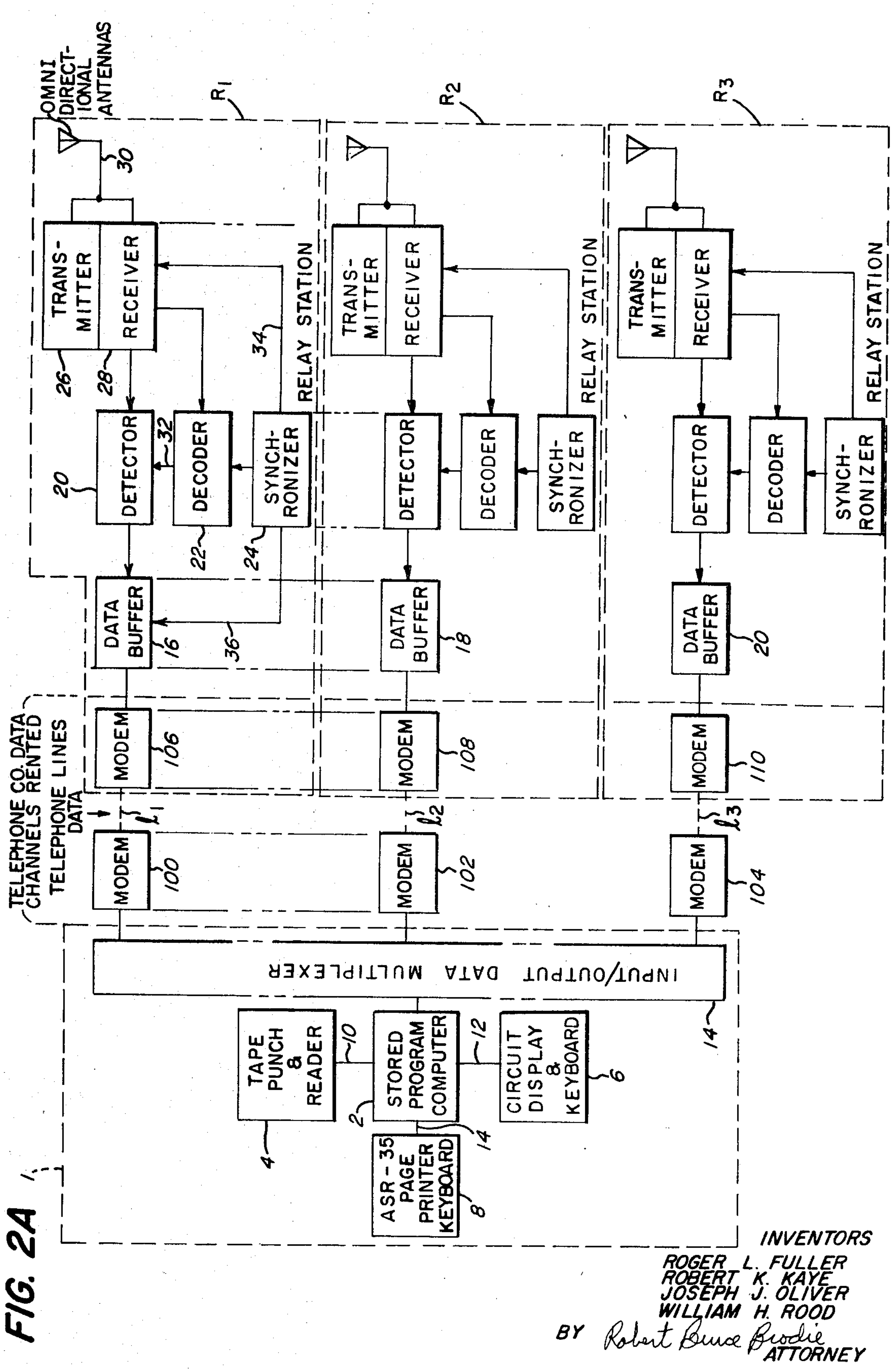
FIGS. 2A and 2B are detailed block diagrams of cooperating elements of the common control arrangement, remote relay stations and surface vehicle transponders.
Figure 2B:
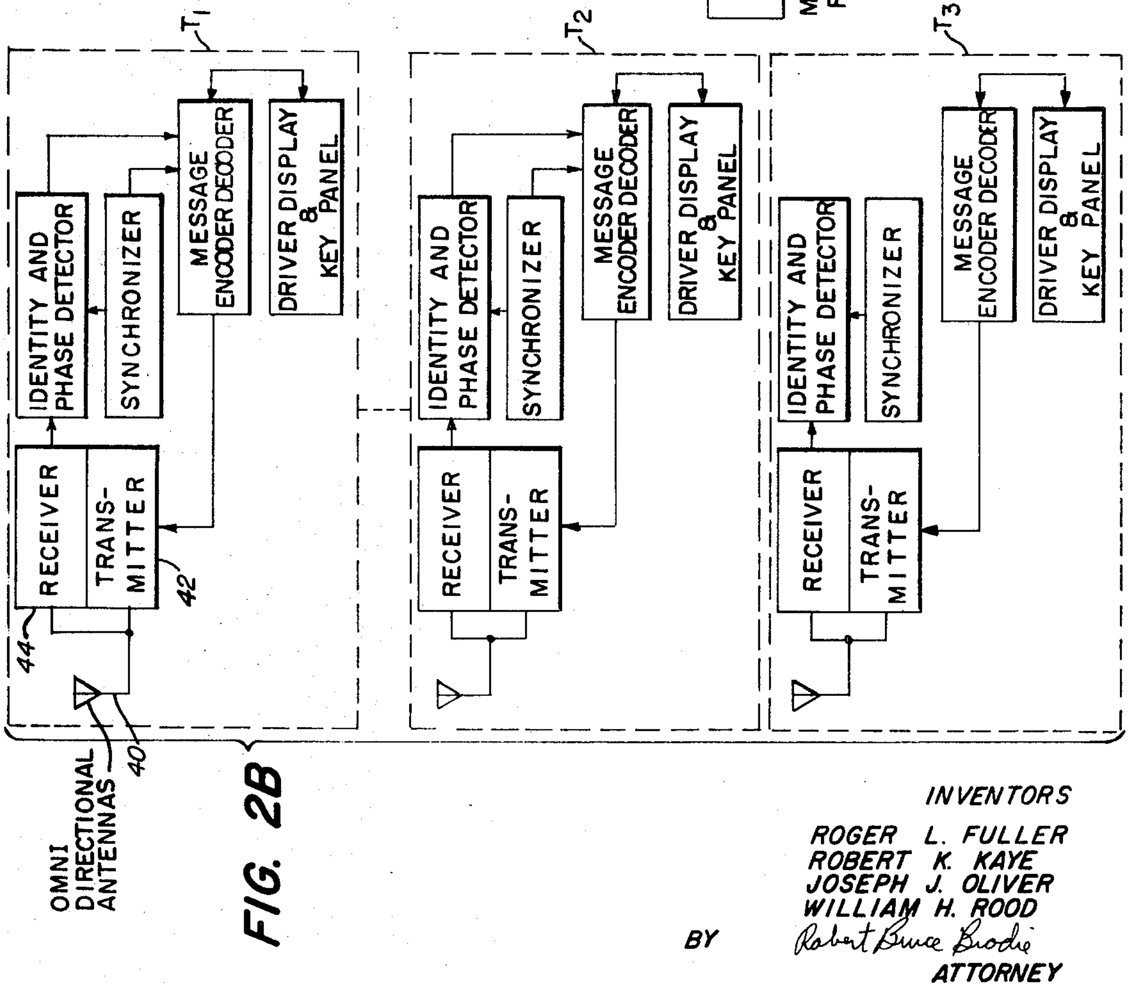

Referring now to FIGS. 2A and 2B of the drawing, there is shown a detailed block diagram of the means in each of the system vehicles. In the succeeding paragraphs the control arrangement, the relay stations, and the transponders will be described in detail.

COMMON CONTROL ARRANGEMENT

The common control arrangement 1 includes a stored program computer 2 selectively connectable to a tape punch and reader 4, a circuit display and keyboard 6, and a page printer 8 over corresponding lines 10, 12, and 14. The tape punch and reader 4, circuit display and keyboard 6, and page printer and keyboard 8, represent manual and visual data entry and output devices permitting manual interface with the system control. Stored program computer 2 contains sequences of program order words and data representative of the message formatted and further including program sequences for automatically checking and regulating the system.

Illustratively, the computing element communicates with one or more of the remote relay stations $R_1$, $R_2$, and $R_3$ over corresponding data links $l_1$, $l_2$, and $l_3$. The data links comprise telephone lines terminating in corresponding modems at each end thereof. The modems 100, 102, and 104 in turn terminate in an input-output data multiplexer 14 at one end and the modems 106, 108, and 110 at the other end terminate in data buffers 16, 18, and 20.

REMOTE RELAY STATION

At remote relay station $R_1$, for example, data buffer 16 electrically communicates with detector 22. Buffer 16 is also time controlled by synchronizer 24. Each relay station additionally includes a transmitter 26, a corresponding receiver 28, and an antenna arrangement 30. Synchronizer 24 time controls the operation of decoder 32 and receiver 28 in addition to data buffer 16 over corresponding paths 32, 34, and 36. As is evident, each of the remote relay stations maintains substantially the same complement of equipment.

TRANSPONDER

Referring now to FIG. 2B, there is shown transponders $T_1$, $T_2$, and $T_3$. In this invention, each transponder is situated in a separate mobile surface vehicle. Furthermore, each transponder includes an antenna 40, a receiver 42 tuned to detect signals from a remote relay transmitter, say for example 30. In a similar manner, transponder transmitter 42 generates a signal to which remote relay receiver 28 is responsive.

TIMING SEQUENCE

Figure 3A:
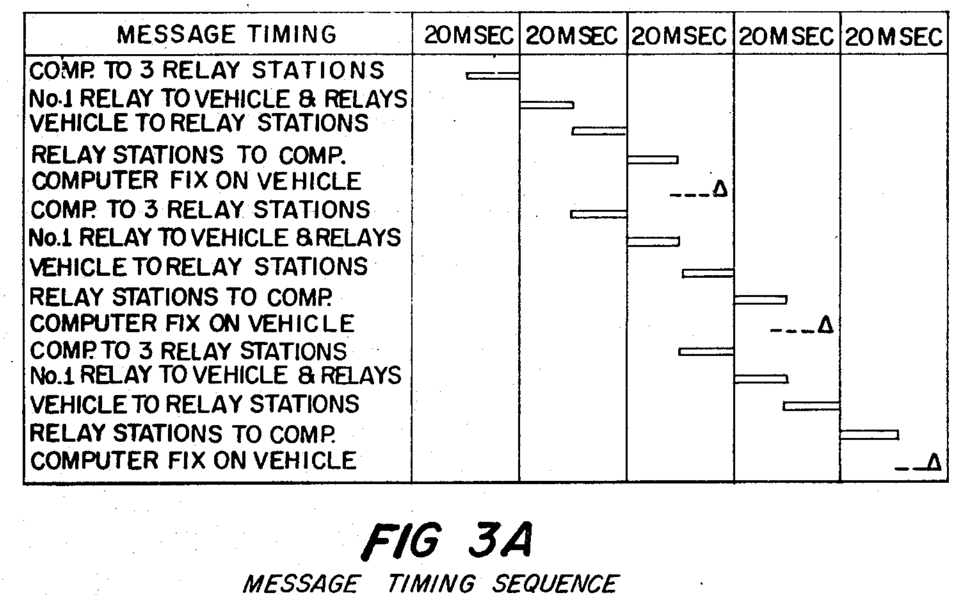
FIG. 3A illustrates the general timing sequence among system elements.

Referring now to FIG. 3A of the drawing, there is shown a message traffic-timing sequence chart. Message traffic in this system contemplates basically five functions to be performed in three consecutive 20-millisecond periods. In the first 20-millisecond period, the common control activates three remote relay stations and communicates a formatted message to at least one of them. This selected relay station broadcasts the formatted message to the vehicle and to others of the activated relay stations during the second 20-millisecond interval. Also in this same interval, the vehicle formats and sends a reply signal to the relay stations. The relay stations in turn during the third interval format the reply signal, measure the phase difference, and transmit same to the common control. During the latter half of this third 20-millisecond interval, the computer element calculates a fix on the vehicle.

MESSAGE FORMATS AND TRANSMISSION REQUIREMENTS

Figure 3B:
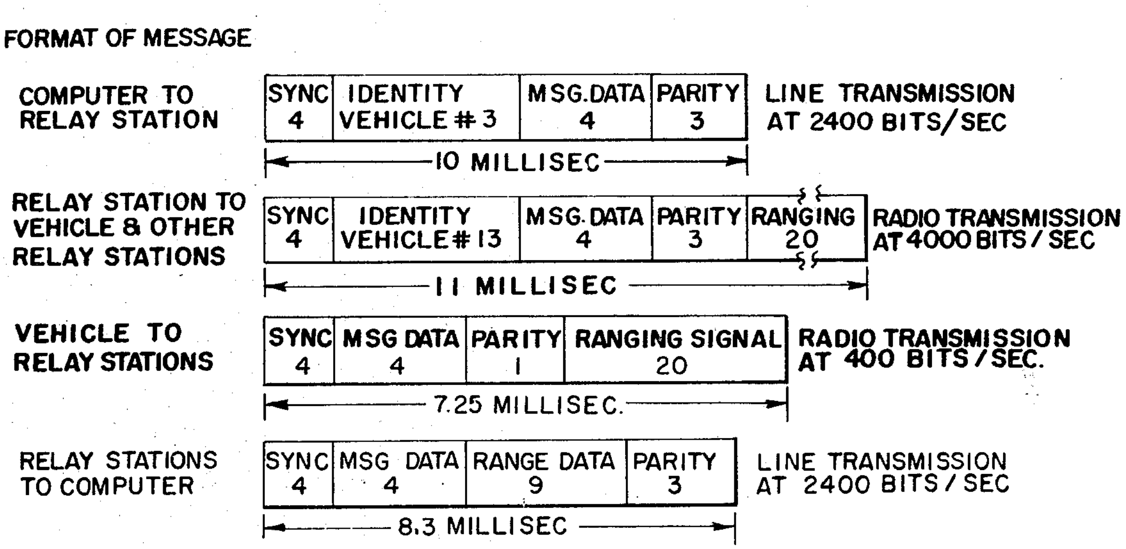
FIG. 3B illustrates the composition, sequence, and timing of formatted messages transmitted among system elements.

Referring now to FIG. 3B of the drawing, there is shown several examples of the message formats which are used to define the communication between system elements. Computer 2 in communicating with any of the remote relay stations must transmit a message over a telephone line which has an approximate information capacity of 2,400 bits per second. A standard 10-millisecond message length is used. This message includes four synchronizing bits, a vehicle identification code of three bits, a message data portion of four bits, and three bits for parity checking. The selected relay station which broadcasts this message adds on a ranging tone equivalent to 20 bits in length and radio transmits the message at a 4,000 bit per second rate. The elapsed time for each broadcast comprises 11 milliseconds. The vehicle reply signal to the relay stations occupies 7.25 milliseconds in time and includes a four-bit synch signal, a four-bit message data signal, one parity bit, and a ranging tone of 20 bits or cycles in length.

Referring again to FIGS. 2A and 3B, it will be seen that the message received by a selected relay station, for example $R_1$, consists of vehicle identification, data, and a ranging tone and is composed at $R_1$ subsequent to receipt of a message from control arrangement 1. This message is used to frequency modulate a 3-watt transmitter 26 operating at 450 megahertz. The modulation frequency is 4 kilohertz. Transmitter 26 output is fed to omnidirectional antenna 30 with a typical gain of 6 db.

Referring now to FIG. 2B of the drawing, the broadcasting signal received from relay station say $R_1$, has been received at a signal to noise level of 43 db. for the ranging signal and at least 26 db. for the identification and data. This signal is used to generate a synchronized local ranging signal and update data at the vehicle. The data which is ultimately to be transmitted back to the control arrangement along with the synchronized ranging tone frequency modulates transmitter 42. This transmitter output is fed to omnidirectional antenna 40 with an antenna gain of approximately 3 db.

THE MULTIPLEXER

It should be noted that the input-output data multiplexer 14 provides a necessary interface between computer 2 and the data channel modems. The multiplexer 14 will accept bits in parallel and output messages in serial form. The multiplexing unit also receives data from the data modems and interrupts the computer when complex messages have been received.

The design and construction of multiplexers are well known to the art and in general must place data and address codes on proper transmission buses and distribute them on appropriate lines. If any device coupled to the multiplexer is addressed, this unit will sample and store the complete address code and utilize the command code on the address bus so that the data will be transferred to the indicated data channel. The data may then be shifted out to the data modem at a predetermined rate. This is preceded, of course, by a 3-bit synchronization code.

SIGNAL TO NOISE ANALYSIS

It is necessary to establish that the radio frequency path can be utilized with a resultant signal to noise ratio at a receiver which is acceptable. The limiting factor in urban communication systems of this type is the precision to which the phase shift of the ranging tone can be measured, Preferably, phase shift should be measured to within 0.5 microseconds, 99 percent of the time. Restated, one-half microsecond delay is approximately 250 feet of range error (0.72° at 4 kilohertz). The probability relationship that the phase error is less than 0.72° for 99 percent of the time is given in "Information Transmission, Modulation, and Noise" by Schwartz at page 410, as follows:

$$\mathrm{ERF}(S/N)^{1/2}\,\Delta\phi=0.99=\mathrm{ERF}(1.82)$$

$$\Delta\phi=1.26(10)^{-2}\text{ radians }(0.72^\circ\text{ at 4 kilohertz})$$

$$S/N=(1.82)^2/(\Delta\phi)=2.07(10)^4=43\text{ db.}$$

Thus, the signal to noise ratio required for a range error less than 250 feet for 99 percent of the time with a 4 kilohertz reference is 43 decibels.

The 43-db. signal to noise ratio is required at both vehicle and at the relay stations. The vehicle transponder synchronizes an internal clock to within 0.5 microseconds of the received ranging signal. The relay station in turn also detects the ranging signal received from the vehicle to within 0.5 microseconds. Within these constraints the time delay measured will be within 0.7 microseconds for 99 percent of the time. This analysis does not allow for range errors due to other than direct path.

A gain of 6 db. is typical for the relay stations and 3 db. for the bus antenna. A maximum range of 8 miles is useful for an approximate 200 square mile area.

Experiments with the preferred embodiment of the invention were made using a relay station transmitter power of 3 watts for a maximum range of 8 miles. An attenuation of 105 db. with the ambient noise at a carrier frequency 450 megahertz was experienced. A 25 kilohertz band around the carrier frequency was at −131 dbw. A 53 decibel signal to noise ratio was the expected value for the ranging signal. A margin of approximately ten decibels was reserved for such phenomenon as fading, cable losses, and other determined losses.

The signal to noise ratio for the data portion of the message is 53 db. minus the noise improvement factor in a receiver post detection band. To inhibit errors due to radiation pattern, parity bits are incorporated into the radio frequency transmissions and a parity check is, of course, performed at the receiver.

THE RADIO TRANSMITTER AND RECEIVER

Radio communication is carried on via the 450-megahertz radio frequency band. A transmitter, a receiver and associated power supplies integrated with visual equipment are, of course, included at both the stations and vehicles. Preferably, the transmitter and receiver should be completely solid state including transistors of the silicon planar type. Transmitters 30 and 42 shown in FIGS. 2A and 2B should preferably employ a crystal oscillator of approximately 4 megacycles per second resonant center frequency. The second harmonic may be selected by the tuned circuit in the collector of the oscillator transistor. A portion of the tuning capacitance of the tuned circuit (not shown) is also in the collector of the oscillator transistor. This part may be formed by a variable capacitant diode, the capacitant which is varied according to the amplitude of the modulation signal applied across it from the standard typical modulation preamplifier. This illustrative type of circuit arrangement produces phase modulation of the carrier which is converted to an equivalent frequency modulation by action of a deemphasis network. Following the modulator stage, a chain of amplifiers and multipliers can be used to raise the frequency and power to required values.

Receivers 28 and 44 shown in FIGS. 2A and 2B preferably employ two stages of RF amplification to provide sufficient gain and selectivity. The first mixer stage should be designed to accept the amplified RF signal and also a signal derived from a local oscillator. This local oscillator may consist of a crystal control oscillator operating at a frequency of approximately 52 megacycles per second followed by two transistor multiplier stages. The final injection frequency of the local oscillator chain should be 35 megacycles per second below that of the RF signal. A blocking filter centered at 35 megacycles per second ought to follow with sufficient selectivity to guard against receiver blocking and a second IF imagery response. A second mixer stage, which ordinarily produces an output signal of 455 kilocycles, is selected by an LC blocking filter. The signal therefrom is amplified in a two-stage RC coupled amplifier before application to the first limiter stage. A second limiter/discriminator stage should preferably be formed from a Round-Travis discriminator and be followed by the audio amplification stage. A carrier operated electronic mute with variable sensitivity controlled from the limiter stage may be fitted with a sealed relay if external switching functions are required.

SYNCHRONIZER

The synchronizer includes detector circuits and master reference oscillator. This oscillator is counted down to yield lower frequencies. It can be phase locked. The synchronizer detector circuits determine that a real signal has been received. When a signal at a receiver has been recognized, counters which are ordinarily a part of this unit are started. One counter is used for shifting data and coarsely establishing the zero axis crossing of the range signal and another unit is started precisely at that zero crossing to generate a phase-locked ranging signal for retransmission. This is a previously described necessary function of the transponder in the vehicle.

Figure 4:
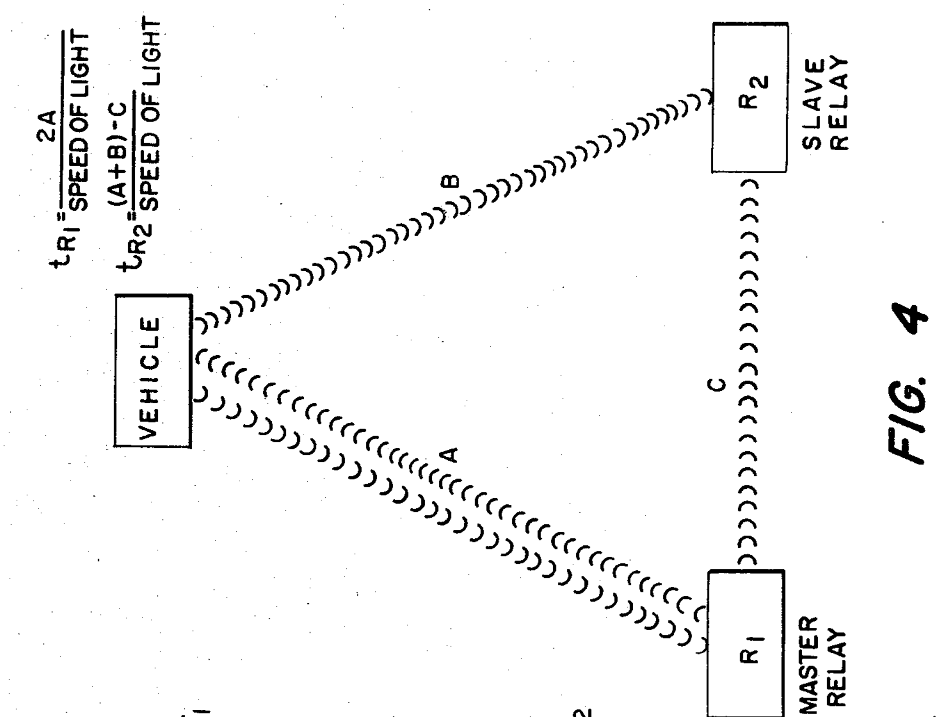
FIG. 4 illustrates the position location between a master and slave relay station in determining the location of a surface vehicle.

Referring now to FIG. 4 of the drawing, there is shown a vehicle in space relation to two relay stations $R_1$ and $R_2$. These stations are respectively designated the master relay and the slave relay. The distance between $R_1$ and the vehicle is A. Between the vehicle and $R_2$ is B, and the distance between $R_2$ and $R_1$ is C. The round trip time for the ranging tone to cover the distance between $R_1$ and the vehicle is 2A over speed of light. The round trip time as measured at the slave relay $R_2$ of a ranging tone broadcast from master relay $R_1$ is $A+B-C$ all over speed of light. Any time delay within the vehicle is excluded because the reply tone from the vehicle is in phase with the received tone from the relay station.

GEOMETRY OF VEHICLE LOCATION

Figure 5:
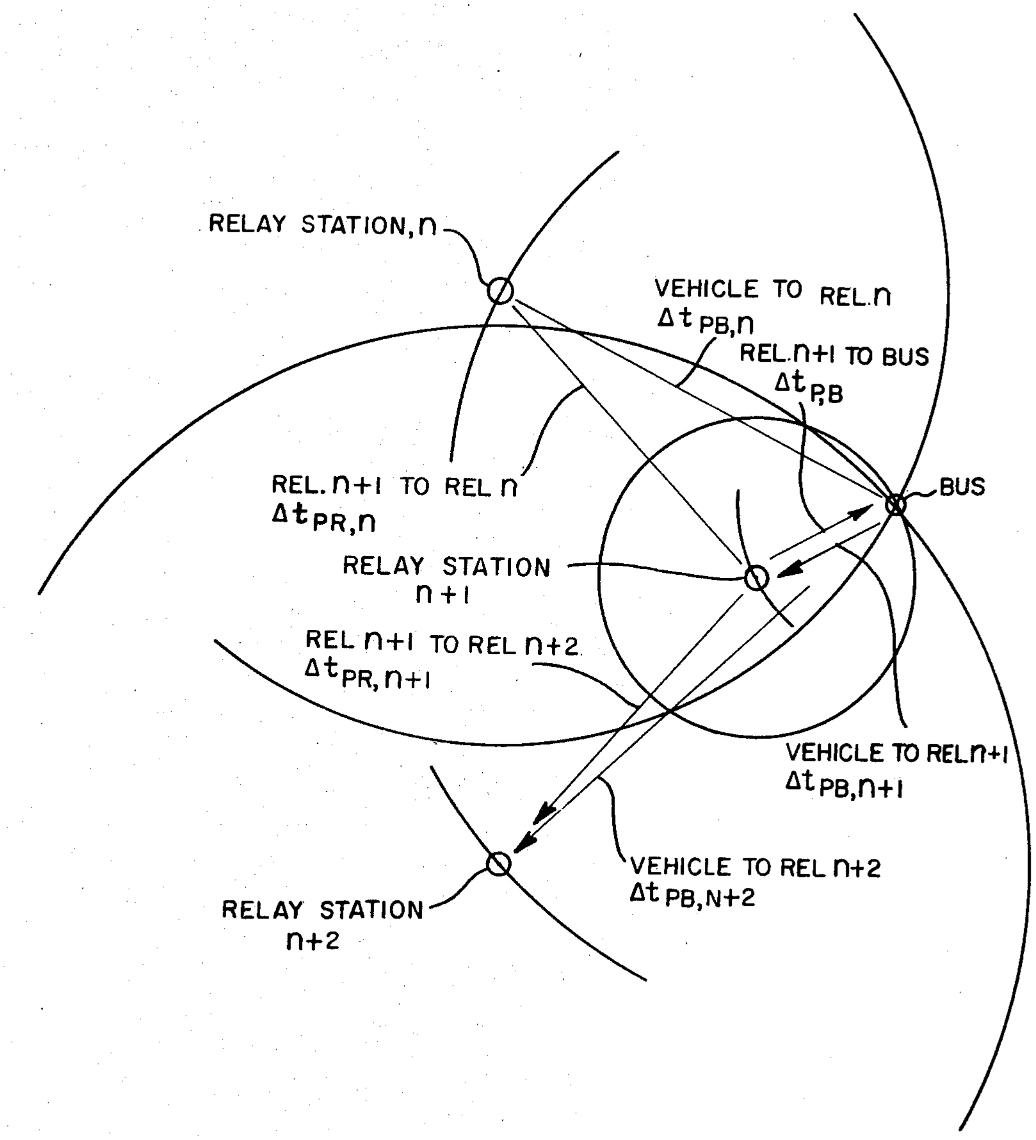
FIG. 5 exhibits the geometry of a typical vehicle location operation.

Referring now to FIG. 5, there is shown the geometry of a typical vehicle location operation. Relay station $n+1$ is taken to be the master station transmitting. Two other stations respectively designated $n$ and $n+2$ are within 8 miles of relay station $n+1$. Upon receipt of a formatted message from the common control arrangement, relay station $n+1$ transmits an omnidirectional signal which includes the point designated bus and the other relay stations $n$ and $n+2$. It is desirable in responding to the ranging tone that enough of the ranging tone be received in order to phase lock onto it. The time measurement signal in both the transponder and the slave relay stations is in itself an internally generated ranging signal. This signal becomes retransmitted by the transponder as a ranging tone on the reply signal.

MULTIPATH

Referring now to FIGS. 6A and 6B of the drawing, there is shown the respective side and plan views of the relevant fixed and mobile station positions in a typical urban center. Illustratively, fixed transmitter site F is fixed at a distance of say seven miles from a mobile transponder at site M. A spurious second path signal may be received through scattering from buildings at site S. The spurious path length from F to S is $a$. The path length from S to M is $b$.

The echoes signals result when some components of the signal travel by indirect routes and involve reflection from buildings and other prominent structures. Because the path $a+b$ is longer than the direct path, the corresponding components of the signal will be delayed compared to that obtained over the direct path. Thus, for example, if the signal is simply a continuous wave carrier, the received signal will be the vector sum of the carriers which arrive by way of the direct and echo paths. Reference may be made to proceedings of the IRE, Volume 38, No. 3, March 1950, pages 255 to 258, for an article entitled "Echoes in Transmission at 450 Megacycles from Land to Car Radio Units" by W. Young, Jr. and L. Lacy. This reference describes the statistical nature and duration of the multipath signals. It should be noted that the mean value of the delay is of the order of 2 microseconds corresponding to a range area of approximately 1000 feet. Thus, on the average the largest multipath components are related to ranges within one thousand feet of the true or shortest path range.

Referring now to FIGS. 6C and 6B, there is shown multiple location checks to increase accuracy. Multiple location fixes, as for example A, B, and C with respect to the mobile vehicle M, easily provide the required accuracy. If the probable error for one fix is "$x$" feet, then the probable error for "$n$" fixes is $x/n^{1/2}$. Thus, if the probable error of one fix is 600 feet, then the probable error based on four fixes is $600/4^{1/2}=300$ feet.

While the particular embodiments of the invention have been shown and described, it will be evident to those skilled in this art that various changes and modifications may be made without departing from the invention in its broader aspects, and, therefore the appended claims are intended to cover all such changes and modifications that fall within the true spirit and scope of the invention.

We claim:

1. A vehicle location system comprising:
 - a plurality of remote relay stations, each station being capable of transmission of a predetermined relay signal and of signal reception;
 - a plurality of transponders, each located at a corresponding vehicle, each transponder being operable upon receipt of one of said predetermined signals from at least one of said relay stations, said predetermined signal having a ranging tone impressed thereon;
 - means at each of said plurality of transponders responsive only to a corresponding vehicle identification code in said predetermined signal for generating a reply signal within a predetermined time after initial receipt of said predetermined signal;
 - means at said plurality of remote relay stations for receiving said reply signal; and
 - means at each of said plurality of remote relay stations for measuring the phase difference between the original ranging tone and the reply signal.

2. A vehicle location system in accordance with claim 1 further comprising:
 - means for transmitting said phase measurements from said remote relay station to a central location; and
 - means at said central location including computing means for determining the location of said plurality of vehicles.

3. In combination:
 - at least one transmitter for transmitting interrogating signals having at least coded interrogation portions;
 - a plurality of transponders located in vehicles at spaced locations responsive to different identification codes of said interrogation portions for receiving said interrogating signals and for transmitting a composite reply signal, said reply signal comprising an identification portion and a tone signal; and
 - a plurality of receiving means at a plurality of different predetermined locations for receiving said reply signal and for measuring the phase of said tone signal with respect to a phase reference signal.

4. A combination in accordance with claim 3 further comprising:

means for processing data including at least said phase measurements for determining the location of said vehicles.

5. A combination in accordance with claim 4 wherein said vehicles comprise a fleet of mobile surface vehicles.

6. A combination in accordance with claim 4 wherein said identification code in the interrogation portion of said composite transmitted signal is received by said plurality of transponders, such that only one of said transponders is responsive to said identification code; and means at said one transponder for generating a coded reply signal within a predetermined time after initial receipt of said transmitted signal.

7. A combination in accordance with claim 6 wherein said transmitted composite signal is an omnidirectional signal.

* * * * *